US012650298B2

(12) United States Patent (10) Patent No.: US 12,650,298 B2

Maruta et al. (45) Date of Patent: Jun. 9, 2026

(54) EDGE SHAPE MEASUREMENT APPARATUS AND METHOD OF MEASURING EDGE SHAPE

(71) Applicant: Fujikoshi Machinery Corp., Nagano (JP)

(72) Inventors: Masashi Maruta, Nagano (JP); Yuya Kanno, Nagano (JP)

(73) Assignee: FUJIKOSHI MACHINERY CORP., Nagano (JP)

( * ) Notice: Subject to any disclaimer, the term of this patent is extended or adjusted under 35 U.S.C. 154(b) by 0 days.

(21) Appl. No.: 19/187,556

(22) Filed: Apr. 23, 2025

(65) Prior Publication Data

US 2025/0377197 A1 Dec. 11, 2025

(30) Foreign Application Priority Data

Jun. 7, 2024 (JP) ................................. 2024-093254

(51) Int. Cl.
G01B 11/24 (2006.01)
G01B 11/00 (2006.01)
G01B 11/06 (2006.01)

(52) U.S. Cl.
CPC ............ G01B 11/24 (2013.01); G01B 11/005 (2013.01); G01B 11/06 (2013.01); *G01B 2210/54* (2013.01); *G01B 2210/56* (2013.01)

(58) Field of Classification Search
CPC ....... G01B 11/24; G01B 11/005; G01B 11/06; G01B 2210/54; G01B 2210/56

(Continued)

(56) References Cited

U.S. PATENT DOCUMENTS 7,532,318 B2 * 5/2009 Meeks ............... G01N 21/9501
356/237.1
10,876,976 B2 * 12/2020 Shih ................... G01N 21/9505

(Continued)

FOREIGN PATENT DOCUMENTS

JP 2008-102014 5/2008
JP 2010-60532 3/2010

(Continued)

OTHER PUBLICATIONS

Extended European Search Report dated Sep. 29, 2025 in corresponding European Application No. 25172493.6.

(Continued)

*Primary Examiner* — Tri T Ton

(74) *Attorney, Agent, or Firm* — Stephen J. Weyer, Esq.; Stites & Harbison, PLLC

(57) ABSTRACT

There is provided an edge shape measurement apparatus and a method of measuring an edge shape capable of accurately measuring the edge shape of a wafer without focusing when scanning with the displacement sensor. The displacement sensor configured to measure the edge shape of the wafer having a plate like shape is provided, and is configured to rotationally be driven taking a predetermined point inside the wafer as a rotational center in a plane which includes the rotational center and is perpendicular to upper and lower surfaces of the wafer while keeping a constant radius with the rotational center, and is configured to measure a distance to a point on a surface of the wafer located on a straight line connecting the rotational center and the displacement sensor by a rotational angle.

15 Claims, 12 Drawing Sheets

(58) Field of Classification Search
USPC ......................................................... 356/601
See application file for complete search history.

(56) References Cited

U.S. PATENT DOCUMENTS

| | | | |
|---|---|---|---|
| 2005/0059174 A1* | 3/2005 | Steele ................. | G01N 27/002 |
| | | | 438/14 |
| 2009/0122304 A1* | 5/2009 | Jin ..................... | G01N 21/9503 |
| | | | 356/237.4 |
| 2011/0080592 A1* | 4/2011 | Sato ....................... | G01B 11/24 |
| | | | 356/511 |
| 2013/0044316 A1 | 2/2013 | Gastaldo et al. | |
| 2018/0106722 A1* | 4/2018 | Fukuhara ........... | G03G 15/0131 |

FOREIGN PATENT DOCUMENTS

| | | |
|---|---|---|
| JP | 2015-106679 | 6/2015 |
| JP | 2020-20717 | 2/2020 |
| KR | 10-2017-0041874 | 4/2017 |

OTHER PUBLICATIONS

Notice of Reason for Refusal dated Sep. 3, 2025 in corresponding Korean Application No. 10-2025-0065830.

* cited by examiner

START

CALIBRATION STEP — S51

PREPARATION STEP — S52

POSITIONING STEP — S53

MEASUREMENT STEP — S54

MEASUREMENT OF
ENTIRE CIRCUMFERENCE OF
WAFER IS COMPLETED?

NO

YES

END

EDGE SHAPE MEASUREMENT APPARATUS AND METHOD OF MEASURING EDGE SHAPE

CROSS-REFERENCE TO RELATED APPLICATION

This application is based upon and claims the benefit of priority of the prior Japanese Patent Application No. 2024-093254, filed on Jun. 7, 2024, and the entire contents of which are incorporated herein by reference.

TECHNICAL FIELD

The present invention relates to an edge shape measurement apparatus configured to measure an edge shape of a wafer, and a method of measuring the edge shape.

BACKGROUND ART

Such a measurement device as described below for an inspection (in particular, edge shape measurement) of an edge portion of a semiconductor wafer (hereinafter simply referred to as a "wafer" in some cases) is known.

That is, in PTL 1 (JP-A-2010-60532), there is disclosed a technique of irradiating a wafer end surface as a measurement target with measuring light using a confocal optical system, positioning a focus of the measuring light with a focal position adjustment device, and detecting a defocusing amount. Since the focal position changes with a position of a focal point surface on the wafer end surface, a distance from a sensor to the wafer end surface can be measured by detecting the defocusing amount, and thus, it is possible to acquire the edge shape.

Further, in PTL 2 (JP-A-2020-20717), there is disclosed a technique of acquiring the edge shape of the wafer by performing scanning so as to draw a circular arc centering on the wafer end surface with the confocal optical system which adopts a detector having a line shape. More specifically, a focal point in an illumination area having a line shape is set inside the wafer, and the edge shape of the wafer is acquired from the focal point position on the wafer end surface large in curvature and an angle of a sensor optical axis.

SUMMARY OF INVENTION

Technical Problem

However, in the technique disclosed in PTL 1, it is necessary to put a focus on a surface of the wafer end surface, but the curvature of the wafer end surface is extremely small in some cases, and there arises a problem that the reflected light is diffused, and it is difficult to put the focus at a pinpoint on the focal point surface of the wafer end surface.

In the technique disclosed in PTL 2, it is necessary to set the focus of the measuring light having a line shape inside the wafer end surface, and there arises a problem that the adjustment of the focal position becomes difficult, and an accurate measurement of the edge shape cannot be achieved since the distance from the sensor to the wafer end surface is not directly measured.

Solution to Problem

The present invention has been accomplished under the circumstances described above, and has an object to provide an edge shape measurement apparatus and a method of measuring an edge shape which are capable of performing an accurate measurement of the edge shape of the wafer without making a focus when performing scanning with a displacement sensor.

The present invention solves the problems described above with such a solution as described below as an embodiment.

That is, the edge shape measurement device of the disclosure is provided with a displacement sensor configured to measure the edge shape of the wafer having a plate like shape, and the displacement sensor is configured to rotationally be driven taking a predetermined point inside the wafer as a rotational center in a plane which includes the rotational center and is perpendicular to upper and lower surfaces of the wafer while keeping a constant radius with the rotational center, and is configured to measure a distance to a point on a surface of the wafer located on a straight line connecting the rotational center and the displacement sensor by a rotational angle.

Further, a method of measuring an edge shape of the disclosure is a method of measuring an edge shape of a wafer having a plate like shape including a measurement step rotationally driving a displacement sensor taking a predetermined point inside the wafer as a rotational center in a plane which includes the rotational center and is perpendicular to upper and lower surfaces of the wafer while keeping a constant radius, and measuring a distance to a point on a surface of the wafer located on a straight line connecting the rotational center and the displacement sensor by a rotational angle.

Advantageous Effects of Invention

According to the disclosure described above, it becomes possible to accurately measure the edge shape of the wafer without making a focus when performing scanning with the displacement sensor.

DESCRIPTION OF EMBODIMENTS

Figure 1:
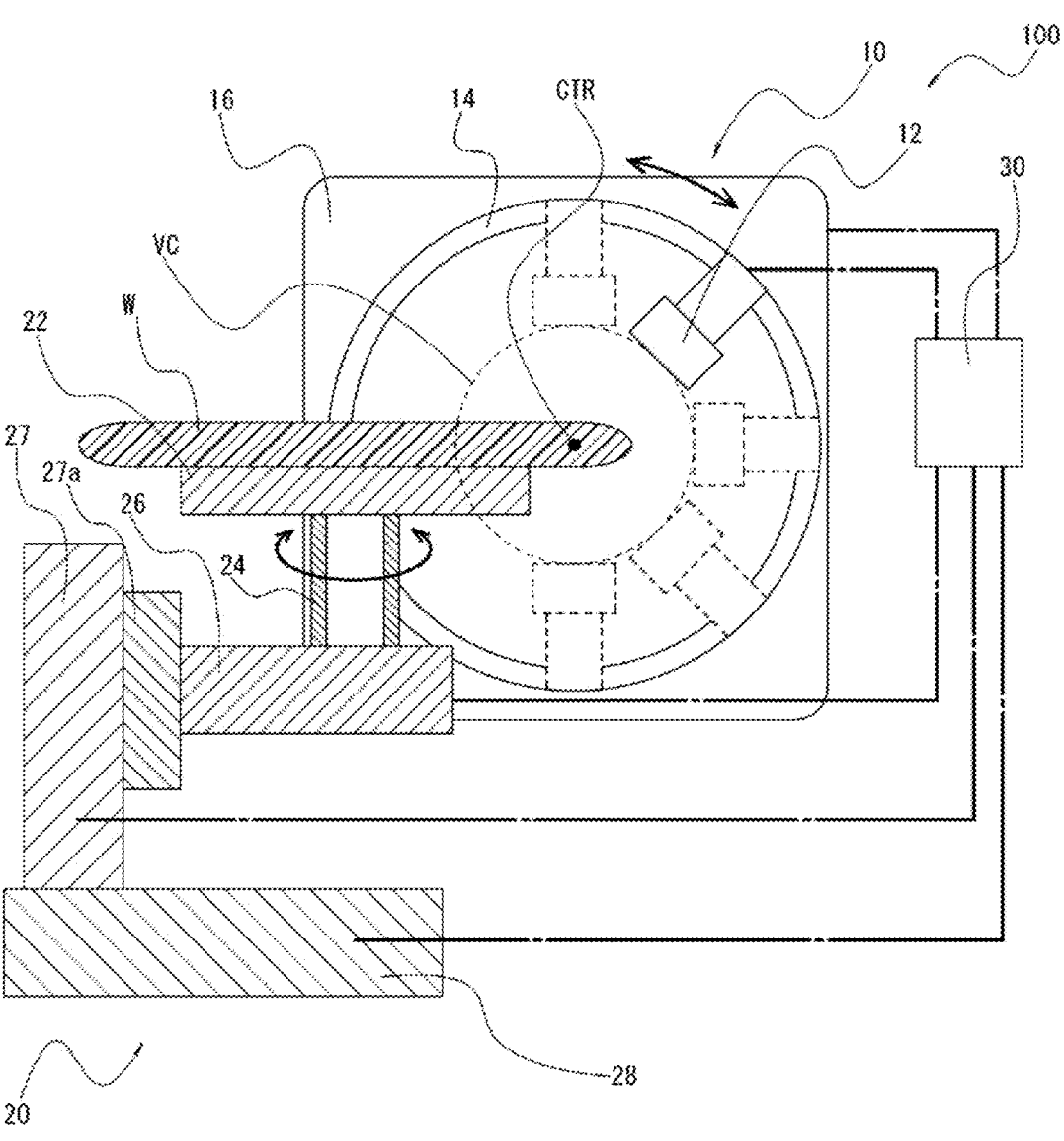
FIG. 1 is a front view (a schematic diagram) of an edge shape measurement apparatus in each of embodiments of the present invention.
Figure 2:
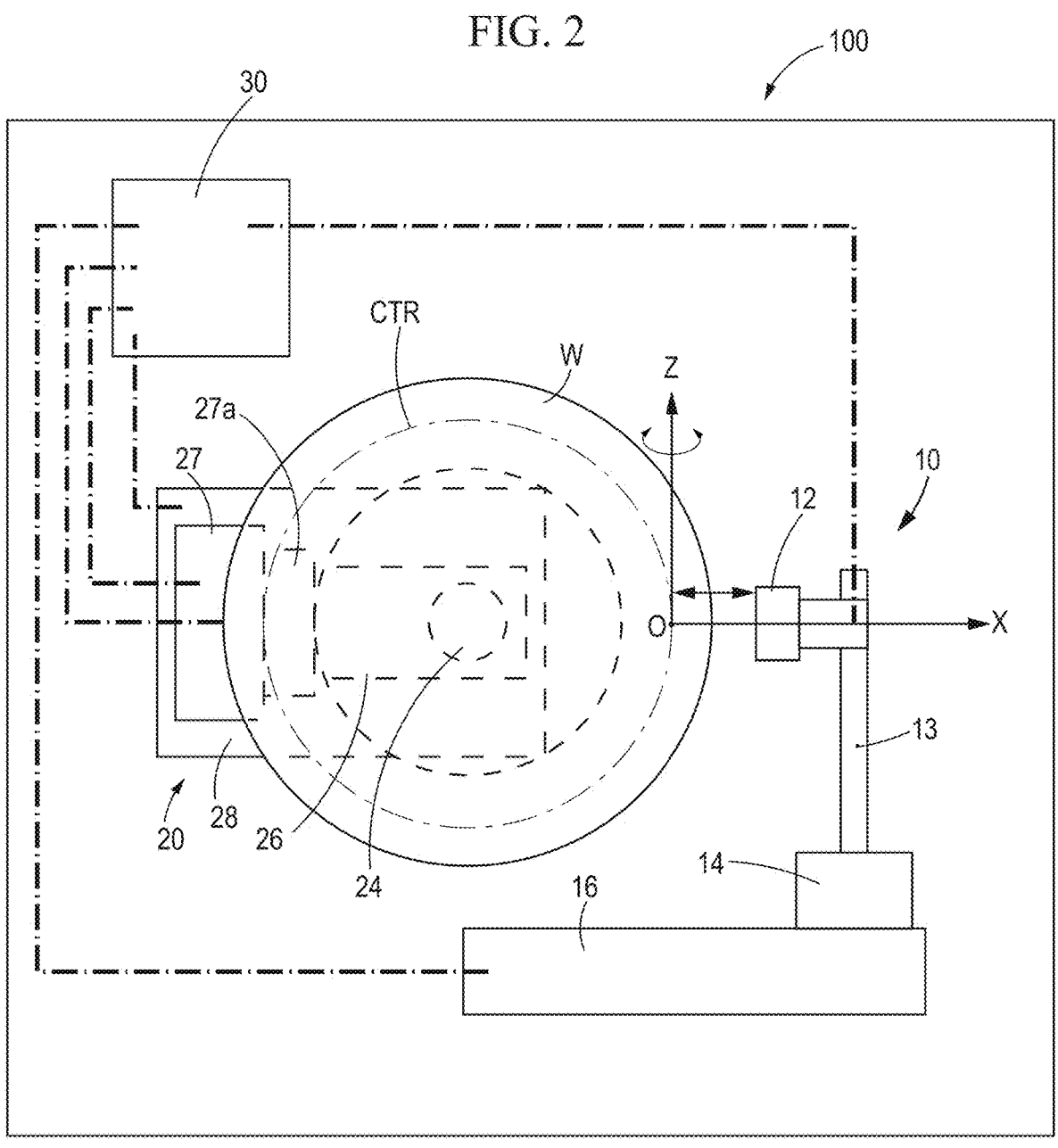
FIG. 2 is a plan view (a schematic diagram) of the edge shape measurement apparatus in each of the embodiments of the present invention.
Figure 3:
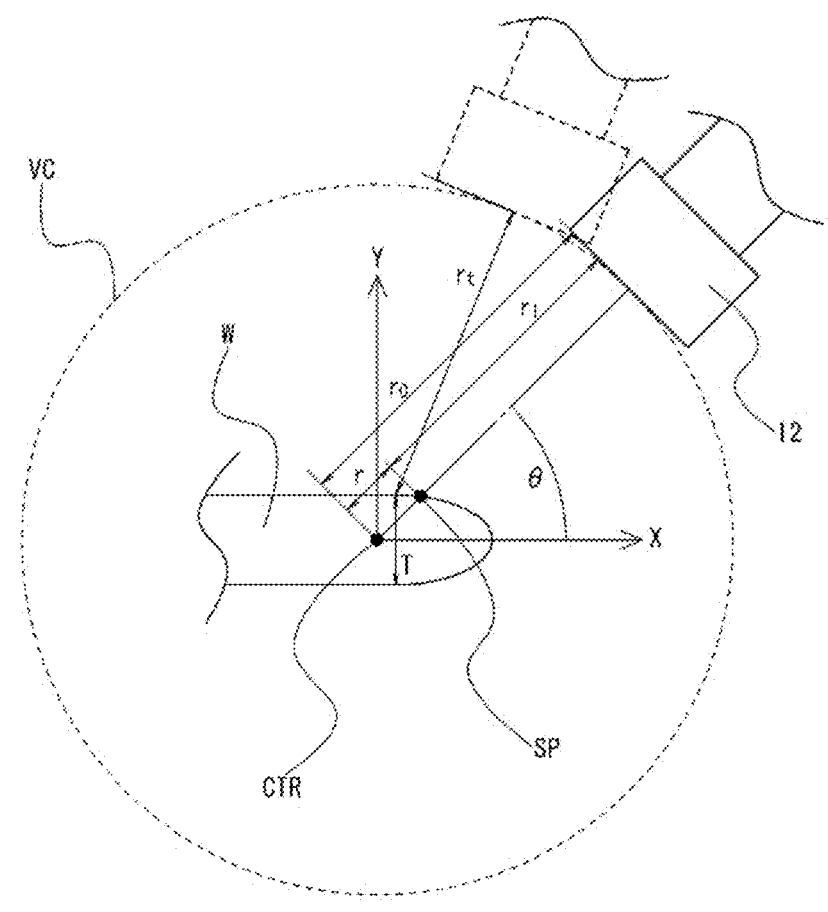
FIG. 3 is an explanatory diagram of the edge shape measurement apparatus and a method of measuring an edge shape in each of the embodiments of the present invention.
Figure 4:
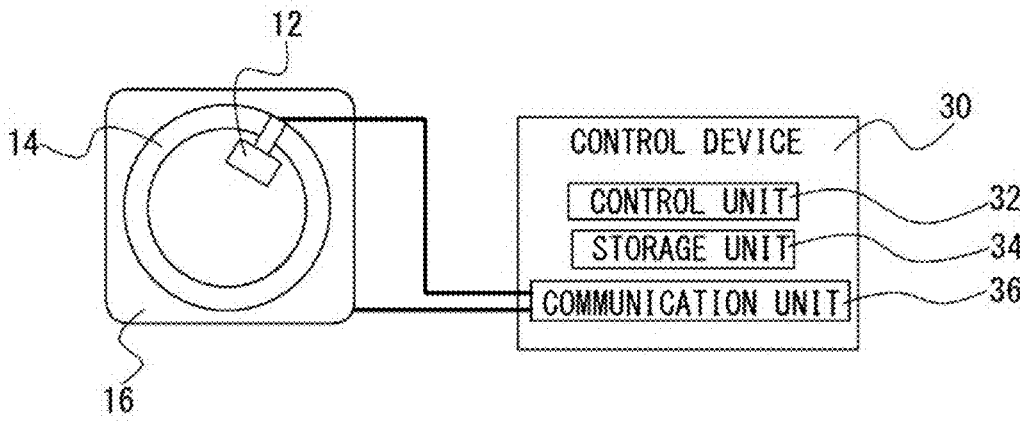
FIG. 4 is a functional block diagram of a control device of the edge shape measurement apparatus in a first embodiment of the present invention.
Figure 5:
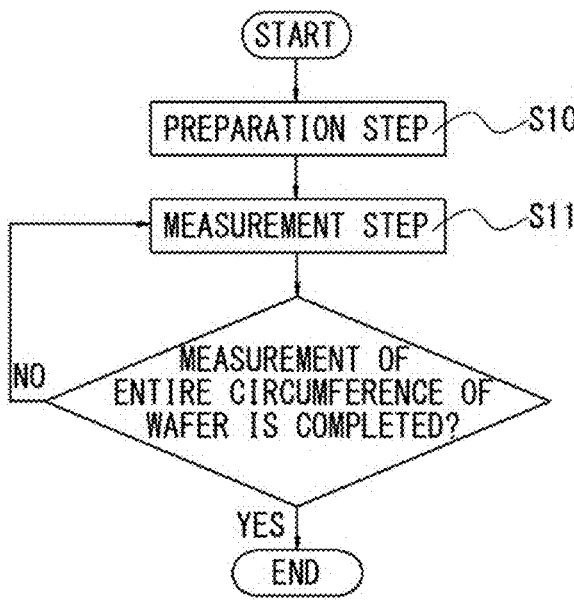
FIG. 5 is a flowchart of the method of measuring the edge shape in the first embodiment of the present invention.

Some embodiments of the invention will hereinafter be described in detail with reference to the drawings. FIG. 1 is a front view (a schematic diagram) of an edge shape measurement apparatus 100 in each of the embodiments of the present invention. FIG. 2 is a plan view (a schematic diagram) of the edge shape measurement apparatus 100 in each of the embodiments of the present invention. FIG. 3 is an explanatory diagram of the edge shape measurement apparatus 100 and a method of measuring an edge shape in each of the embodiments of the present invention. FIG. 4 is a functional block diagram of a controller, namely control device 30 of the edge shape measurement apparatus 100 in a first embodiment of the present invention. FIG. 5 is a flowchart of the method of measuring the edge shape in the first embodiment of the present invention. It should be noted that in all the drawings for describing the embodiments, members having the same function are denoted by the same reference symbol, and redundant description thereof will be omitted in some cases.

A wafer W in each of the embodiments is a silicon wafer formed to have a plate like shape (in particular, a disk like shape) as an example, and is formed to have a diameter of several centimeters to several tens of centimeters, and a thickness of several micrometers to several millimeters, but the shape, the material, the dimensions, and so on are not limited to these. It should be noted that the wafer W may be provided with a notch or an orientation flat in an end portion.

Further, surfaces (in particular, surfaces processed to be flat) of the wafer W in each of the embodiments are respectively referred to as an "upper surface" and a "lower surface" in some cases, and further, the upper surface and the lower surface are collectively referred to as "upper and lower surfaces" in some cases.

Further, a side surface of the wafer W in each of the embodiments is referred to as an "edge portion" in some cases, and further, a shape of the edge portion is referred to as an "edge shape" in some cases. As an example, the edge portion protrudes toward a radial direction of the wafer W to have a convex cross-sectional shape. More specifically, the edge portion has the convex cross-sectional shape formed of a straight line, a curved line, or a combination thereof.

As shown in FIG. 1, the edge shape measurement apparatus 100 in each of the embodiments is provided with a measuring device 10, a wafer holding device 20, and the control device 30. That is, the edge shape measurement apparatus 100 has a configuration in which a rotational angle $\theta$ of a displacement sensor 12 provided to the measuring device 10 and a phase (i.e., an orientation of the wafer W with respect to one of the rotational angles $\theta$ of the displacement sensor 12) of the wafer W mounted on the wafer holding device 20 are controlled by the control device 30.

FIRST EMBODIMENT

Edge Shape Measurement Apparatus 100

As shown in FIG. 1, the measuring device 10 has the displacement sensor 12, a rotating plate 14, and a rotary drive unit 16. That is, there is adopted a configuration in which the displacement sensor 12 (in particular, a side portion of the displacement sensor 12) is coupled to the rotating plate 14 via such a support part (a support part protruding toward the wafer W from the rotating plate 14 side) 13 as shown in FIG. 2, as an example, and when the rotating plate 14 is rotated, the displacement sensor 12 is also rotated. It should be noted that the support part 13 is formed to have a length with which the wafer W and the rotating plate 14 do not interfere with each other when the wafer W is moved to a position where the wafer W can be measured by the displacement sensor 12.

It should be noted that the measuring device 10 is not limited to the configuration provided with the rotating plate 14 and the rotary drive unit 16, and can appropriately be changed for purposes. As an example, it is possible to adopt a configuration in which the measuring device 10 has a guide and a slide mechanism (both not shown), the displacement sensor 12 is coupled to the slide mechanism, and the slide mechanism is slid on the guide on a circular path with respect to a predetermined rotational center CTR. That is, it is sufficient for the measuring device 10 to have a configuration in which the displacement sensor 12 is rotated on a virtual circle VC with respect to the predetermined rotational center CTR set inside the wafer W.

The displacement sensor 12 has a configuration in which the displacement sensor 12 is rotationally driven taking a predetermined point inside the wafer W as the rotational center CTR in a plane which includes the rotational center CTR and is perpendicular to the upper and lower surfaces of the wafer W while keeping a constant radius $r_0$, and measures a distance $r_1$ to a point SP on the surface of the wafer W located on a straight line connecting the rotational center CTR and the displacement sensor 12 by the rotational angle $\theta$. That is, the displacement sensor 12 does not require focusing when performing scanning with the displacement sensor 12, and is capable of measuring the point SP on the surface of the wafer W. It should be noted that it is preferable for the surface described above to include the center of the wafer W.

Further, the displacement sensor 12 has a configuration of acquiring the rotational angle $\theta$ and the distance $r_1$ as measurement data wherein the rotational angle $\theta$ is an angle between an axis (corresponding to an X axis in FIG. 3) which includes the rotational center CTR and extending in the radial direction of the wafer W having a disk like shape, and the straight line connecting the rotational center CTR and the displacement sensor 12.

It should be noted that it is possible to acquire the edge shape of the wafer W by acquiring the rotational angle $\theta$ and the distance $r_1$ as the measurement data, but a distance r from the rotational center CTR to each of the points SP can be obtained as $r=r_0-r_1$, and the rotational angle $\theta$ and the distance r may be acquired as the measurement data.

Further, in each of the embodiments, the displacement sensor 12 is a known multicolor confocal displacement sensor 12, but this is not a limitation, and the displacement sensor 12 may be a known ultrasonic displacement sensor or a known contact displacement sensor.

Figure 18:
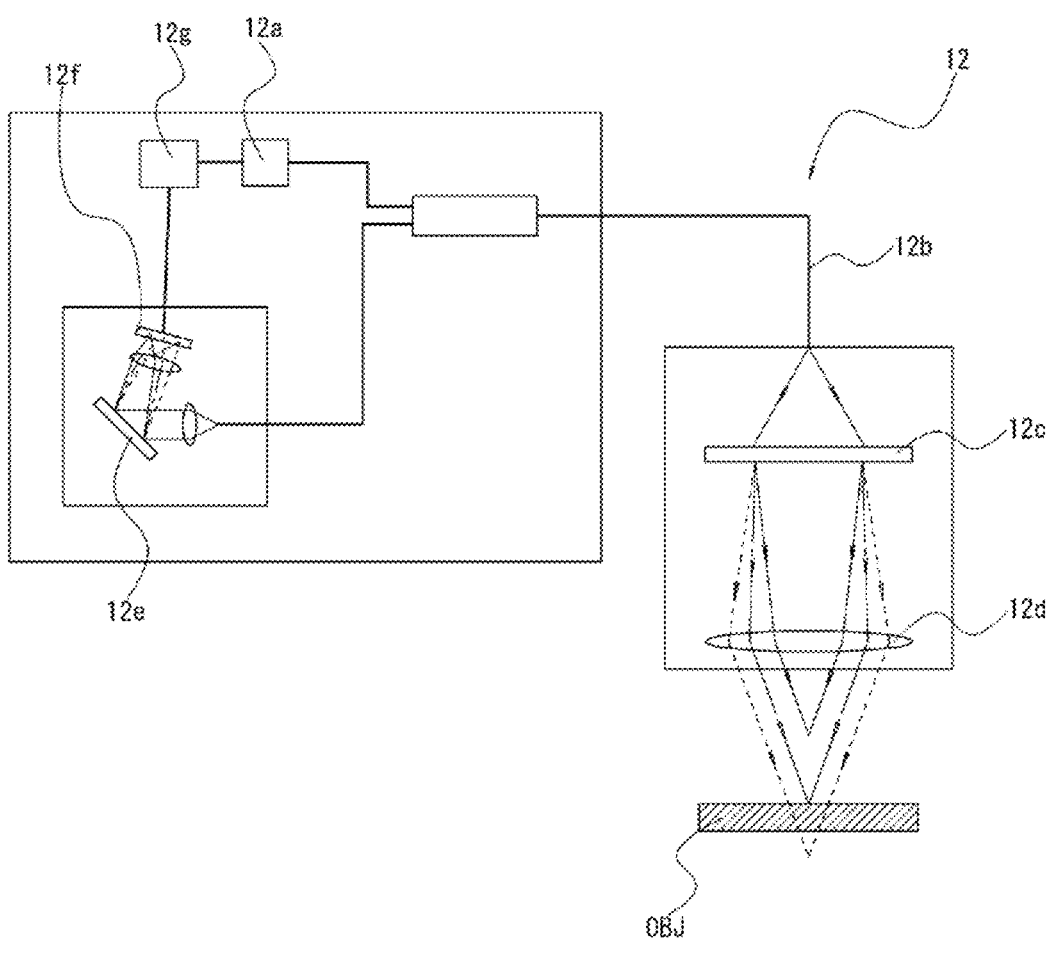
FIG. 18 is a schematic diagram of a known multicolor confocal displacement sensor.

As shown in FIG. 18, as an example, the multicolor confocal displacement sensor 12 has a configuration in which white light is emitted from a light source 12a, the white light is sequentially transmitted through a multi-fiber 12b, a diffraction lens 12c, and an objective lens 12d, and a measurement object OBJ is irradiated with the white light as irradiation light different in focal position with respect to the irradiation direction by the wavelength. Further, the multicolor confocal displacement sensor 12 has a configuration in which light with a certain wavelength is focused at the measurement object OBJ, reflected at the measurement object OBJ, and is then transmitted through a diffraction grating 12e, and a light receiving element 12f receives that light. That is, a processing unit 12g of the multicolor confocal displacement sensor 12 has a configuration of acquiring the wavelength of specific light focused on the measurement object OBJ, and is therefore capable of measuring the distance $r_1$ shown in FIG. 3 from the displacement sensor 12 to the measurement object OBJ without performing focusing when performing scanning with the displacement sensor 12.

It should be noted that the virtual circle VC in a related-art sensor which requires focusing is a rotational trajectory of a light receiving element of that sensor, but in contrast thereto, the virtual circle VC of the multicolor confocal displacement sensor 12 is, as an example, a trajectory of a tip position of the multicolor confocal displacement sensor 12. This is because, the multicolor confocal displacement sensor 12 does not measure the distance to the light receiving element 12f, but acquires the wavelength of the light received by the light receiving element 12f to acquire the distance corresponding to each wavelength. It should be noted that the virtual circle VC is not limited to the trajectory of the tip position of the multicolor confocal displacement sensor 12, and can appropriately be changed for purposes. That is, it is sufficient that the distance $r_1$ from the point SP on the surface of the wafer W to the virtual circle VC and the wavelength of the light received by the light receiving element correspond to each other when determining the virtual circle VC.

The rotating plate 14 has a configuration of being rotated around a predetermined rotational axis by the rotary drive unit 16. More specifically, the rotational axis of the rotating plate 14 includes the predetermined rotational center CTR inside the wafer W, and the rotating plate 14 has a configuration of being rotated in a plane which includes the rotational center CTR and is parallel to a plane perpendicular to the upper and lower surfaces of the wafer W. Due to the configuration described above, it is possible to set a predetermined point inside the wafer W as the rotational center CTR to rotationally drive the displacement sensor 12 in a plane which includes the rotational center CTR, and is perpendicular to the upper and lower surfaces of the wafer W while keeping the constant radius $r_0$ with respect to the rotational center CTR.

Further, the rotating plate 14 is formed of, as an example, a metal material (an aluminum alloy, a stainless alloy, or the like), and is formed to have an annular shape with an inner diameter and an outer diameter of several centimeters to a dozen centimeters, and a thickness of several millimeters, but this is not a limitation, and can appropriately be changed for purposes.

Further, it is preferable for the rotating plate 14 to have a configuration in which the displacement sensor 12 is rotationally driven with respect to at least one of a range (hereinafter referred to as a "rotation range" in some cases) of the rotational angle $\theta$ and the rotational center CTR in which a position (as an example, points on the upper and lower surfaces of the wafer W the thickness of which is measured) corresponding to the thickness of the wafer W can be measured. That is, the displacement sensor 12 may have a configuration of being driven with respect to the rotation range in which the position corresponding to the thickness of the wafer W can be measured, and the rotation range is set, as an example, to $-120° \leq \theta \leq 120°$. Further, the displacement sensor 12 may have a configuration of being rotationally driven with respect to the rotational center CTR at which the position corresponding to the thickness of the wafer W can be measured, and the rotational center CTR is set, as an example, inside the upper and lower surfaces in a plan view of the wafer W. Due to the configuration described above, it is possible to accurately measure the edge shape of the wafer W including the thickness of the wafer W.

Although the rotary drive unit 16 has, as an example, a servomotor (not shown), this is not a limitation, and the rotary drive unit 16 can appropriately be changed for purposes.

As shown in FIG. 1, the wafer holding device 20 has a wafer holding table 22, a cylindrical part 24, a rotary drive unit 26, an up-and-down motion drive unit 27, and a slide drive unit 28. Thus, it is possible to relatively move the wafer W with respect to the displacement sensor 12.

Further, there is adopted a configuration in which the wafer holding table 22 is coupled to the cylindrical part 24, and by the cylindrical part 24 being rotated by the rotary drive unit 26, the wafer holding table 22 is also rotated. Thus, it is possible to acquire the edge shape of the wafer W throughout the entire circumference of the wafer W.

The wafer holding table 22 is formed to have a disk like shape smaller in diameter (smaller in diameter than the wafer W to the extent that the edge portion of the wafer W protrudes from the wafer holding table 22) than the wafer W. Further, the wafer holding table 22 has an adsorption mechanism (not shown) on a surface which holds the wafer W. As an example, the adsorption mechanism has a configuration of suctioning the wafer W with a plurality of holes provided to the wafer holding table 22, but this is not a limitation, and the adsorption mechanism can appropriately be changed for purposes. As another example, the wafer holding table 22 may have a configuration of having a sticking mechanism using a sticking tape instead of the adsorption mechanism. That is, it is sufficient for the adsorption mechanism or the sticking mechanism to have a configuration of holding the wafer W on the wafer holding table 22 so as not to damage the wafer W.

Further, as shown in FIG. 1, the wafer holding table 22 has a configuration of holding the wafer W horizontally, but this is not a limitation, and the wafer holding table 22 can appropriately be changed for purposes. That is, the wafer holding table 22 may have a configuration of holding the wafer W vertically.

Although the rotary drive unit 26 has, as an example, a servomotor (not shown), this is not a limitation, and the rotary drive unit 16 can appropriately be changed for purposes.

Further, the rotary drive unit 26 is coupled to the up-and-down motion drive unit 27 via a guide 27a. Although the up-and-down motion drive unit 27 has, as an example, a servomotor (not shown), this is not a limitation, and the up-and-down motion drive unit 27 can appropriately be changed for purposes. Due to the up-and-down motion drive unit 27, a position of the wafer W in the vertical direction with reference to the displacement sensor 12 can relatively be moved.

Further, the up-and-down motion drive unit 27 is coupled to the slide drive unit 28. The slide drive unit 28 can move the up-and-down motion drive unit 27 (i.e., the wafer W) in a horizontal direction which is parallel to the rotational trajectory of the displacement sensor 12. Further, although the slide drive unit 28 has, as an example, a servomotor (not shown), this is not a limitation, and the slide drive unit 28 can appropriately be changed for purposes.

It should be noted that the arrangement and the configurations of the rotary drive unit 26, the up-and-down motion drive unit 27, and the slide drive unit 28 are not limited to the example described above, and can appropriately be changed for purposes.

As shown in FIG. 1, the control device 30 has a configuration of being coupled to the displacement sensor 12, the rotary drive units 16, 26, the up-and-down motion drive unit 27, and the slide drive unit 28 wirelessly or by wire. Further, as an example, the control device 30 is implemented by an information processing device such as a personal computer or a workstation, and is configured including a CPU, a memory such as a RAM, a ROM, or a RAM and a ROM, and a communication unit, and has a configuration of operating based on a control program set in advance and a setup signal input from the outside. That is, as shown in FIG. 4, the control device 30 has a control unit 32, a storage unit 34, and a communication unit 36, and has a configuration of executing control related to measurement of the displacement sensor 12, control related to rotary drive of the rotary drive units 16, 26, control related to up-and-down motion drive of the up-and-down motion drive unit 27, and control related to slide drive of the slide drive unit 28.

The control unit 32 corresponds to a CPU, and has a configuration of calling a control program from the storage unit 34 to sequentially execute processing of the measurement control, the rotary drive control, the up-and-down motion drive control, and the slide drive control.

The storage unit 34 corresponds to the RAM as a volatile memory and the ROM as a nonvolatile memory. Further, in the storage unit 34, a predetermined control program for operating the edge shape measurement apparatus 100 is stored in advance.

Further, in the storage unit 34, the data (the rotational angle θ and the distance $r_1$) of the distance acquired by the displacement sensor 12.

The communication unit 36 has an interface which can communicate according to a predetermined communication standard wirelessly or by wire.

Method of Measuring Edge Shape

As shown in FIG. 5, the method of measuring the edge shape in the first embodiment is provided with a measurement step S11 of rotationally driving the displacement sensor 12 in a plane which includes the rotational center CTR and is perpendicular to the upper and lower surfaces of the wafer W setting a predetermined point inside the wafer W as the rotational center CTR while keeping the constant radius $r_0$, and measuring the distance $r_1$ to the point SP on the surface of the wafer W on the straight line connecting the rotational center CTR and the displacement sensor 12 by the rotational angle θ.

As a preceding step of the measurement step S11, first, a preparation step S10 is executed. In the preparation step S10, the wafer W is held by the adsorption mechanism (not shown) with respect to the wafer holding table 22. It should be noted that when the wafer W has a disk like shape, the central axis of the wafer W and the rotational axis of the wafer holding table 22 are made to coincide with each other. Further, in the preparation step S10, the rotating plate 14 is rotationally driven to a predetermined angle so that the displacement sensor 12 is arranged at a predetermined measurement start position. It should be noted that it is preferable for any of the positions from a measurement start position to a measurement end position to include a position where the displacement sensor 12 can measure the position corresponding to the thickness of the wafer W. That is, it is preferable for the rotating plate 14 to have a configuration in which the displacement sensor 12 is rotationally driven to at least one of the rotation range and the rotational center CTR in which the position corresponding to the thickness of the wafer W can be measured.

Further, in the preparation step S10, the control unit 32 drives the up-and-down motion drive unit 27 and the slide drive unit 28 so that the rotational center CTR of the displacement sensor 12 is a predetermined position inside the wafer W.

Subsequently, the measurement step S11 is executed. That is, in the measurement step S11, the control unit 32 calls the control program stored in advance in the storage unit 34, and then executes that program to thereby operate the displacement sensor 12. At the same time, in the measurement step S11, the control unit 32 rotationally drives (as an example, rotationally drives, from an upper surface side of the wafer W to a lower surface side of the wafer W) the rotary drive unit 16 at predetermined speed (in particular, constant speed). Thus, the rotating plate 14 (i.e., the displacement sensor 12) is rotated around the rotational center CTR at constant speed, and thus it is possible to scan the edge portion of the wafer W.

It should be noted that it is possible to rotationally drive the rotary drive unit 26 to change the phase (change the phase of the wafer W by about 1° as an example) of the wafer holding table 22 (i.e., the wafer W) after ending the measurement step S11 with respect to one phase of the wafer W, and perform the measurement step S11 once again. Thus, it is possible to measure the edge shape of the wafer W throughout the entire circumference of the wafer W.

SECOND EMBODIMENT

Edge Shape Measurement Apparatus 100

Figure 6:
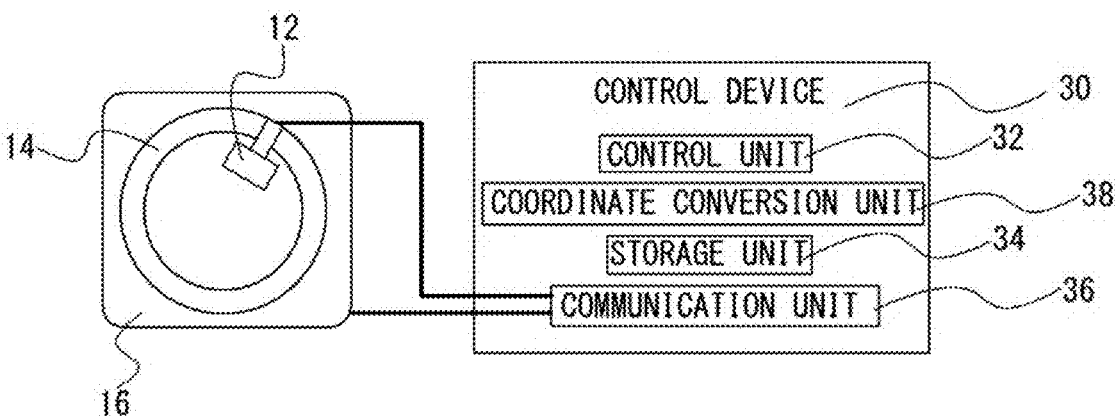
FIG. 6 is a functional block diagram of a control device of an edge shape measurement apparatus in a second embodiment of the present invention.

The edge shape measurement apparatus 100 in a second embodiment is different in configuration of the control device 30 from the edge shape measurement apparatus 100 in the first embodiment as shown in a functional block diagram in FIG. 6. That is, the controller, control device 30, in the second embodiment has the control unit 32, the storage unit 34, the communication unit 36, and a coordinate conversion unit 38.

The coordinate conversion unit 38 corresponds to a CPU, and has a configuration of calling a coordination conversion program from the storage unit 34 to execute conversion processing of the data of the distance acquired by the displacement sensor 12.

The coordinate conversion unit 38 has a configuration of converting the distances $r_1$ measured by the displacement sensor 12 into an X-Y coordinate system. That is, the coordinate conversion unit 38 has a configuration of coordinate-converting the measurement data including the rotational angle $\theta$ and the distance $r_1$ into the X-Y coordinate system shown in FIG. 3.

Here, as shown in FIG. 3, as an example, the X-Y coordinate system described above is a coordinate system which takes the rotational center CTR as the coordinate center, and includes the X axis including the rotational center CTR and extending in the radial direction of the wafer W having a disk like shape, and the Y axis including the rotational center CTR and extending in a perpendicular direction to the upper and lower surfaces of the wafer W. It should be noted that the X-Y coordinate system is not limited to a coordinate system taking the rotational center CTR as the coordinate center.

The distance r from the rotational center CTR to the point SP on the surface of the wafer W has a relationship of $r=r_0-r_1$ with respect to the distance $r_1$ and the constant radius $r_0$ of the virtual circle VC, and further, the coordinate of the point SP on the surface of the wafer W in the X-Y coordinate system is in a relationship of $(x,y)=(r\cos\theta, r\sin\theta)$. The coordinate conversion unit 38 has a configuration of calling the data of the distance which is acquired by the displacement sensor 12 and is stored in the storage unit 34, then executing the coordinate conversion processing described above, and then storing the data thus converted in the storage unit 34. Thus, it is possible to acquire an edge cross-sectional shape of the wafer W.

Method of Measuring Edge Shape

Figure 7:
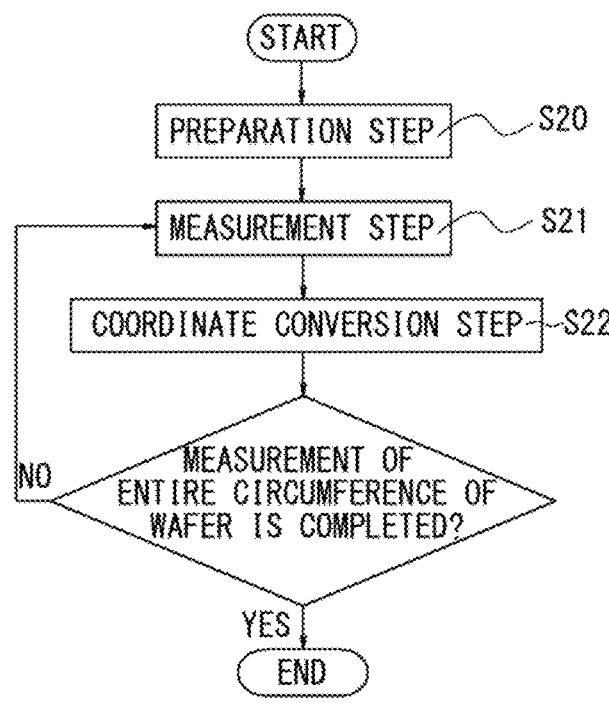
FIG. 7 is a flowchart of a method of measuring an edge shape in the second embodiment of the present invention.

As shown in a flowchart in FIG. 7, a method of measuring an edge shape in the second embodiment is provided with a measurement step S21 (corresponding to the measurement step S11), and a coordinate conversion step S22 of converting the distances $r_1$ measured by the displacement sensor 12 into a predetermined X-Y coordinate system taking the rotational center CTR as the coordinate center.

In the method of measuring the edge shape in the second embodiment, first, a preparation step S20 (corresponding to the preparation step S10) and the measurement step S21 are executed.

Subsequently, the coordinate conversion step S22 is executed. That is, in the coordinate conversion step S22, by the coordinate conversion unit 38 calling a coordinate conversion program stored in advance in the storage unit 34, and then executing that program, the coordinate conversion unit 38 calls the measurement data (the rotational angle $\theta$, the distance $r_1$) stored in the storage unit 34, the constant radius $r_0$, and the X-Y coordinate of the rotational center CTR, then converts these into coordinates in the X-Y coordinate system, and then stores the result in the storage unit 34.

THIRD EMBODIMENT

Edge Shape Measurement Apparatus 100

Figure 8:
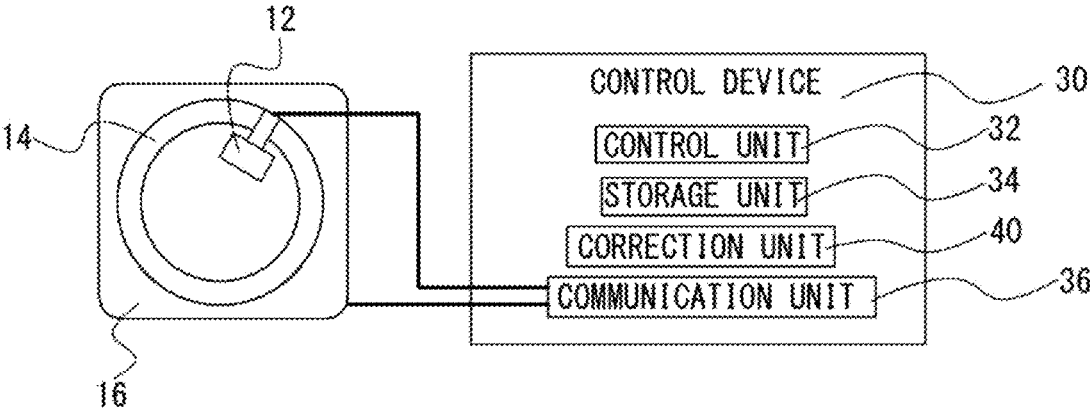
FIG. 8 is a functional block diagram of a control device of an edge shape measurement apparatus in a third embodiment of the present invention.
Figure 9:
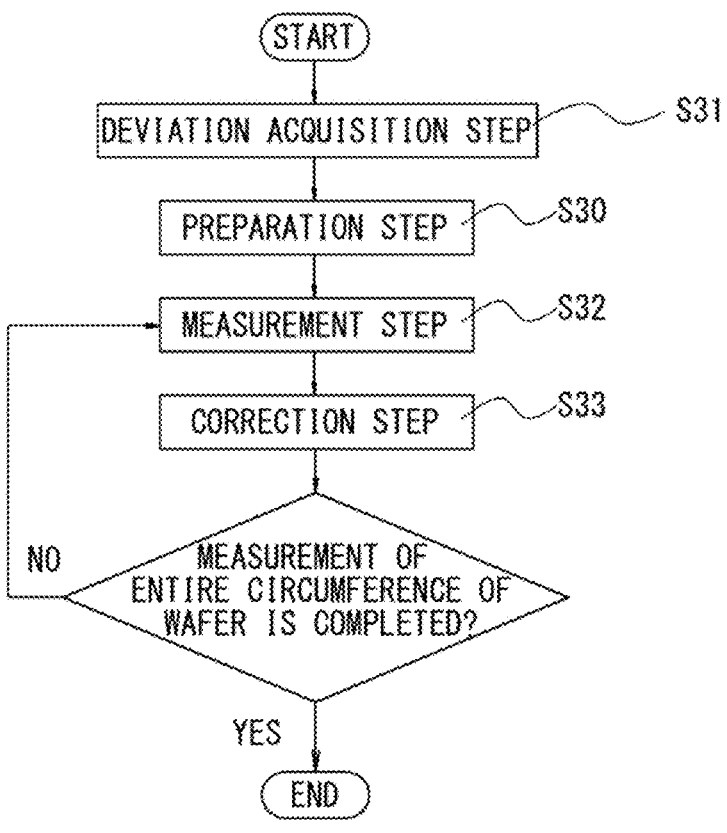
FIG. 9 is a flowchart of a method of measuring an edge shape in the third embodiment of the present invention.

The edge shape measurement apparatus 100 in a third embodiment is different in configuration of the control device 30 from the edge shape measurement apparatus 100 in the first embodiment as shown in a functional block diagram in FIG. 8. That is, the controller, control device 30, in the third embodiment has the control unit 32, the storage unit 34, the communication unit 36, and a correction unit 40.

The correction unit 40 corresponds to a CPU, and has a configuration of calling a correction program from the storage unit 34 to execute correction processing of correcting the distance $r_1$ based on a deviation stored in advance in the storage unit 34.

When performing the correction processing in the correction unit 40, the deviation for correcting the distance $r_1$ is acquired in advance using a predetermined method. That method will be described in detail in <<Method of Measuring Edge Shape>>.

The correction unit 40 has a configuration of calling the data of the deviation corresponding to each rotational angle $\theta$ from the storage unit 34 after the displacement sensor 12 acquires the measurement data, and correcting the data of the distance $r_1$ based on that deviation. Thus, it is possible to correct an error which occurs when making the displacement sensor 12 scan the edge portion of the wafer W to accurately measure the edge shape of the wafer W.

Method of Measuring Edge Shape

The method of measuring the edge shape in the third embodiment is provided with a measurement step S32 (corresponding to the measurement step S11) and a correction step S33 of correcting the distance r based on the deviation acquired in advance.

In the method of measuring the edge shape in the third embodiment, first, a deviation acquisition step S31 is executed. In the deviation acquisition step S31, as an example, a calibration jig having a predetermined cylindrical shape high in circularity is measured with the displacement sensor 12. That is, in the deviation acquisition step S31, the measurement of the circularity with respect to the calibration jig having a predetermined cylindrical shape is executed by rotating the displacement sensor 12, then a difference between a theoretical value and a measured value in each of the rotational angles $\theta$ is acquired as a deviation, and is then stored in advance in the storage unit 34. It should be noted that the method of acquiring the deviation is not limited to the above, and can appropriately be changed for purposes.

Then, as post-steps of the deviation acquisition step S31, a preparation step S30 (corresponding to the preparation step S10) and a measurement step S32 (corresponding to the measurement step S11) described in the first embodiment are executed.

Subsequently, a correction step S33 is executed. That is, in the correction step S33, the correction unit 40 calls a correction program stored in advance in the storage unit 34, and then executes that program to correct the measurement data (the rotational angel $\theta$ and the distance $r_1$) stored in the storage unit 34 with the deviation for each rotational angle $\theta$ also stored in the storage unit 34.

FOURTH EMBODIMENT

Edge Shape Measurement Apparatus 100

Figure 10:
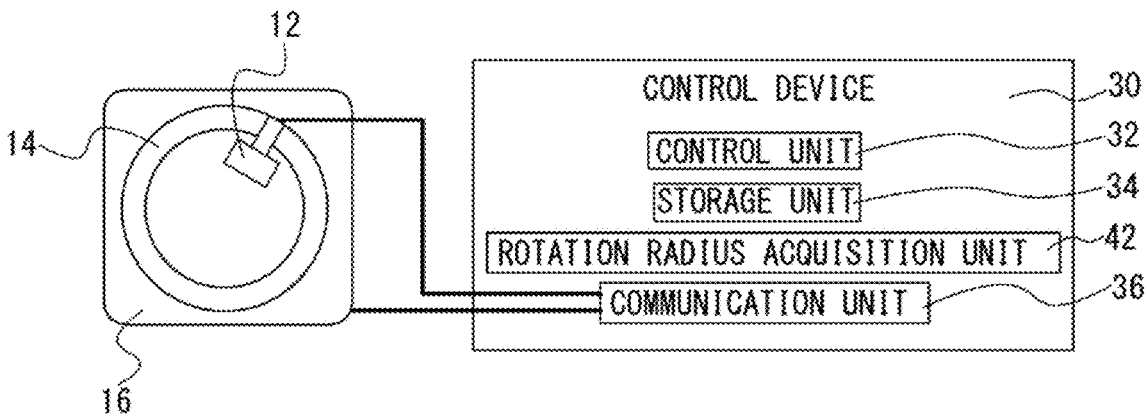
FIG. 10 is a functional block diagram of a control device of an edge shape measurement apparatus in a fourth embodiment of the present invention.

The edge shape measurement apparatus 100 in a fourth embodiment is different in configuration of the control device 30 from the edge shape measurement apparatus 100 in the first embodiment as shown in a functional block diagram in FIG. 10. That is, the controller, control device 30, in the fourth embodiment has the control unit 32, the storage unit 34, the communication unit 36, and a rotation radius acquisition unit 42.

The rotation radius acquisition unit 42 corresponds to a CPU, and has a configuration of calling a rotation radius acquisition program from the storage unit 34 to execute rotation radius acquisition processing of acquiring the rotation radius $r_0$ of the displacement sensor 12 based on the thickness T of the wafer W and a distance $r_t$ to a position corresponding to the thickness of the wafer W.

When performing the rotation radius acquisition processing in the rotation radius acquisition unit 42, the thickness of the wafer W is acquired in advance with a predetermined method. That method will be described in detail in <<Method of Measuring Edge Shape>>.

Further, at the same time as acquisition of the thickness T of the wafer W, the distance $r_t$ to the position corresponding to the thickness of the wafer W is acquired in advance with the displacement sensor 12.

The rotation radius acquisition unit 42 has a configuration of calling the thickness T of the wafer W and the distance $r_t$ from the storage unit 34 to acquire the rotation radius $r_0$ of the displacement sensor 12. As an example, the rotation radius acquisition unit 42 acquires a total value of 0.5T/ sinθ and the distance $r_t$ as the rotation radius $r_0$. Further, the rotational center CTR on this occasion is set, as an example, at a position of a half of the thickness T of the wafer W, but this is not a limitation, and the rotational center CTR may appropriately be changed for purposes. Thus, even when the constant rotation radius $r_0$ when the displacement sensor 12 is rotated is unknown, and is difficult to accurately measure, it is possible to obtain the rotation radius $r_0$ by inverse calculation, and thus, the edge shape of the wafer W can accurately be measured.

Method of Measuring Edge Shape

Figure 11:
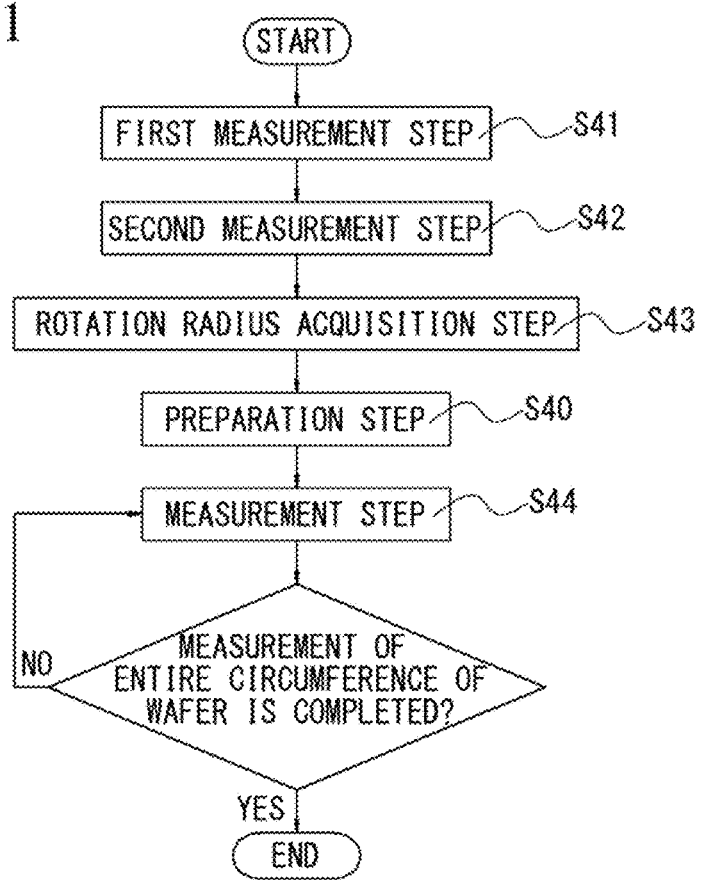
FIG. 11 is a flowchart of a method of measuring an edge shape in the fourth embodiment of the present invention.

As shown in a flowchart in FIG. 11, the method of measuring the edge shape in the fourth embodiment is provided with a first measurement step S41 of measuring the thickness of the wafer W, a second measurement step S42 of measuring the distance $r_t$ to the position corresponding to the thickness T of the wafer W, a rotation radius acquisition step S43 of acquiring the rotation radius $r_0$ of the displacement sensor 12 based on the thickness of the wafer W and the distance $r_t$, and a measurement step S44 (corresponding to the measurement step S11).

That is, in the method of measuring the edge shape in the fourth embodiment, first, the first measurement step S41 is executed. In the first measurement step S41, as an example, the thickness of the wafer W is acquired by a known laser measuring instrument (not shown), but this is not a limitation and can appropriately be changed for purposes. It should be noted that the position of the wafer W where the thickness T of the wafer W is measured is a point on a boundary line between the upper surface or the lower surface of the wafer W and the edge portion of the wafer W as an example, but this is not a limitation, and can appropriately be changed for purposes. As another example, it is possible to measure a position where the wafer W takes the maximum thickness in the vicinity of the boundary line described above in the upper and lower surfaces of the wafer W.

Subsequently, at the same time as the first measurement step S41, or as a post-step of the first measurement step S41, the second measurement step S42 is executed. In the second measurement step S42, the distance $r_t$ to the position corresponding to the thickness T of the wafer W is acquired in advance with the displacement sensor 12.

Subsequently, the rotation radius acquisition step S43 is executed. In the rotation radius acquisition step S43, the rotation radius acquisition unit 42 calls a rotation radius acquisition program stored in advance in the storage unit 34, executes that program, calls the thickness T of the wafer W and the distance $r_t$ from the storage unit 34 to thereby acquire the rotation radius $r_0$ of the displacement sensor 12. It should be noted that as an example, the rotation radius acquisition unit 42 acquires a total value of 0.5 T/sinθ and the distance $r_t$ as the rotation radius $r_0$.

Subsequently, a preparation step S40 (corresponding to the preparation step S10) is executed. It should be noted that in the preparation step S40, the control unit 32 adjusts the position of the wafer W or the displacement sensor 12 so that a predetermined point inside the wafer W becomes the rotational center CTR.

Subsequently, the measurement step S44 is executed. Further, the rotary drive unit 26 may rotationally be driven to execute the edge shape measurement throughout the entire circumference of the wafer W as needed.

FIFTH EMBODIMENT

Edge Shape Measurement Apparatus 100

Figure 12:
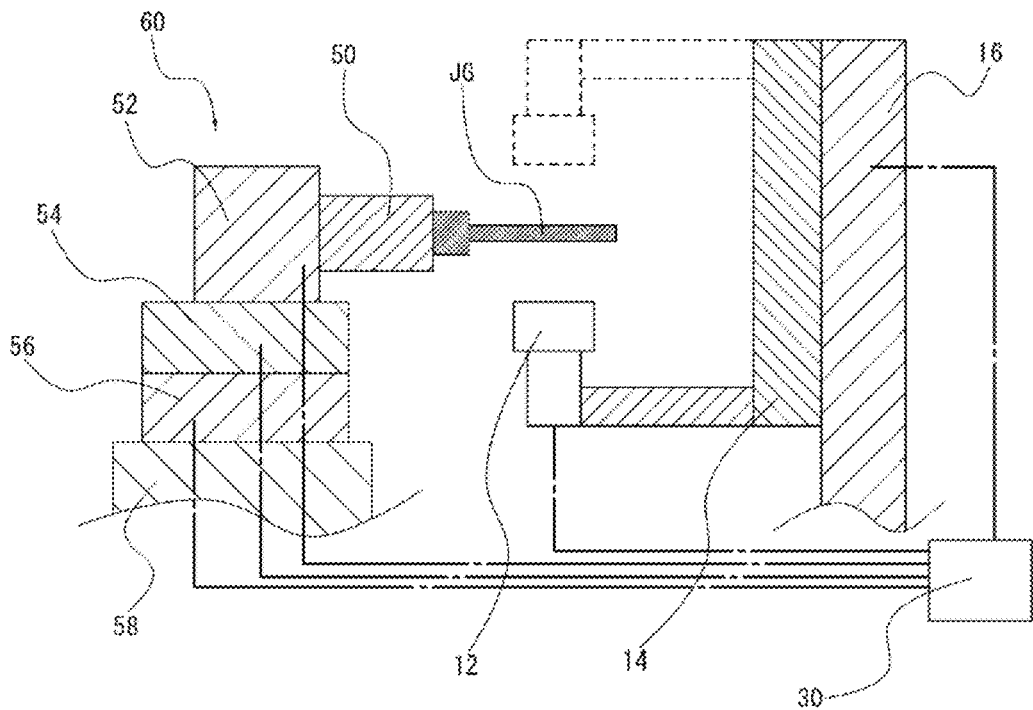
FIG. 12 is a side view (a schematic diagram) of an edge shape measurement apparatus in a fifth embodiment of the present invention.
Figure 13:
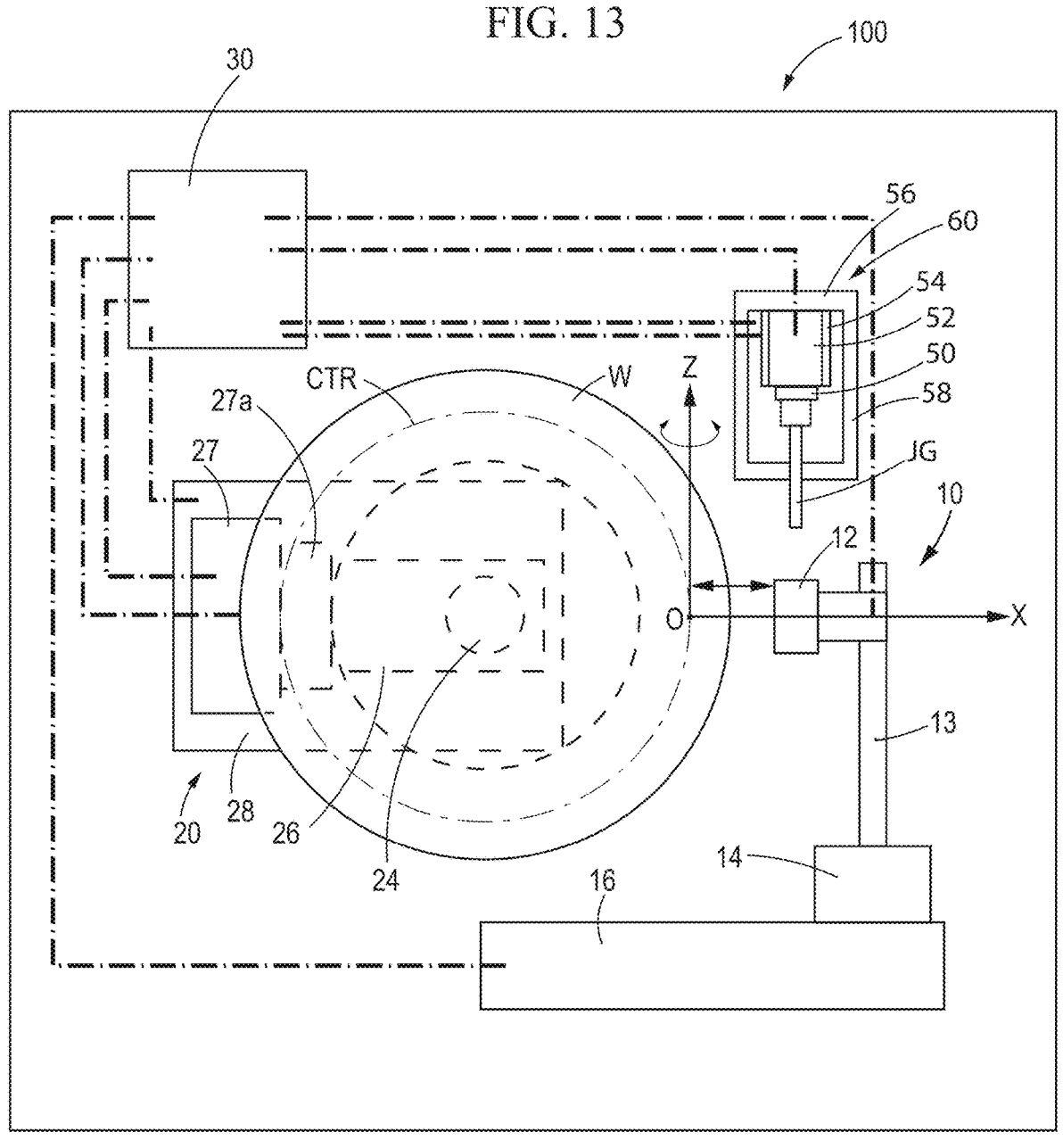
FIG. 13 is a plan view (a schematic diagram) of the edge shape measurement apparatus in the fifth embodiment of the present invention.

The edge shape measurement apparatus 100 in a fifth embodiment is different in configuration from the edge shape measurement apparatus 100 in the first embodiment as shown in a side view (a schematic diagram) in FIG. 12 and a plan view (a schematic diagram) in FIG. 13. That is, the edge shape measurement apparatus 100 in the fifth embodiment is provided with a jig JG and a jig holding mechanism 60 for holding the jig JG and adjusting the position of the jig JG with respect to the displacement sensor 12 described above.

The jig holding mechanism 60 has a holding table 52, an up-and-down motion mechanism 54, a slide mechanism 56, and a base 58. That is, the jig holding mechanism 60 has a configuration in which the jig JG is held by the holding table 52, and the jig JG can relatively be moved to the displacement sensor 12 with the holding table 52, the up-and-down motion mechanism 54, and the slide mechanism 56. Alternatively, the jig holding mechanism 60 may have a configuration of moving the displacement sensor 12.

It should be noted that the jig JG is a jig (a jig having a cylindrical shape in the present embodiment) having a cylindrical portion with a diameter of about 1 mm as an example, and the cylindrical portion is formed so that a cross-sectional surface perpendicular to the axial center thereof has a circularity as high as no larger than ±0.1μm. Further, the jig JG has a large diameter portion having a diameter in a range of about 1 to 2 cm which can be held by a holding unit 50. It should be noted that the shape of the jig JG is not limited thereto, and it is possible to use a jig having spherical portion or a polygonal portion instead of the cylindrical portion.

Further, the holding table 52 has the holding unit 50 capable of holding the large diameter portion of the jig JG. The holding unit 50 has, as an example, a holding hole (not shown) which can hold the jig JG by inserting the large diameter portion of the jig JG into the holding hole. It should be noted that holding of the jig JG is not limited to holding with the holding hole, but can appropriately be changed for purposes. As another example, the holding unit 50 can have a configuration of holding the jig JG with a holding stop (not shown).

Further, the holding table 52 is coupled to the up-and-down motion mechanism 54 and the slide mechanism 56 disposed on the base 58.

Further, as an example, the holding table 52 has a configuration of being driven by a servomotor (not shown) so that the position in the horizontal direction with respect to the displacement sensor 12 can relatively be moved. More specifically, the holding table 52 has a configuration in which the jig JG can relatively be moved in the horizontal direction in parallel to the rotating plate 14. It should be noted that it is possible to manually move the holding table 52, and in that case, the holding table 52 has a configuration of being horizontally moved with an adjust screw (not shown).

As an example, the up-and-down motion mechanism 54 has a configuration of being driven by a servomotor (not shown) so that the position in the vertical direction of the holding table 52 (i.e., the jig JG) with respect to the displacement sensor 12 can relatively be moved. It should be noted that it is possible to manually move the up-and-down motion mechanism 54, and in that case, the up-and-down motion mechanism 54 has a configuration of moving the holding table 52 upward and downward with an adjust screw (not shown).

As an example, the slide mechanism 56 has a configuration of being driven by a servomotor (not shown) so that the position in the horizontal direction of the holding table 52 (i.e., the jig JG) with respect to the displacement sensor 12 can relatively be moved. More specifically, the slide mechanism 56 has a configuration in which the jig JG can relatively be moved so as to come closer to or get away from the rotating plate 14. It should be noted that it is also possible to manually move the slide mechanism 56, and in that case, the slide mechanism 56 has a configuration of horizontally moving the holding table 52 with an adjust screw (not shown).

Figures 14, 15:
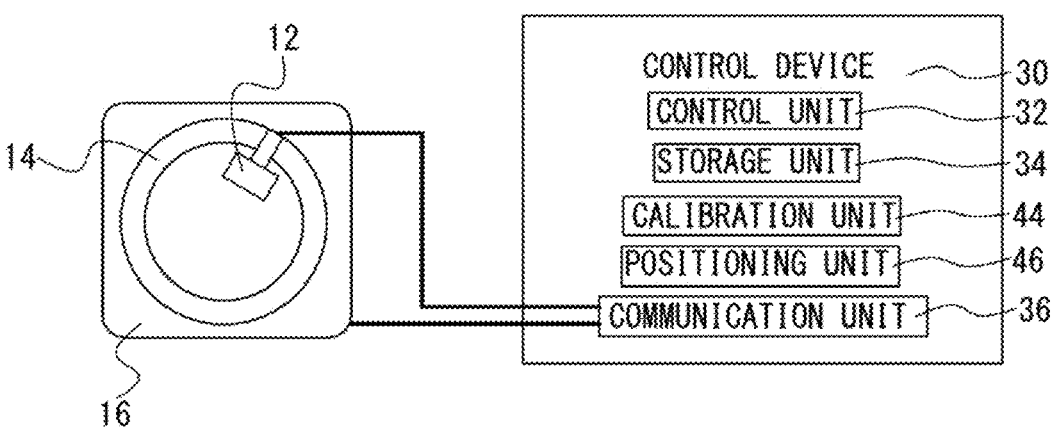
FIG. 14 is a functional block diagram of a control device of the edge shape measurement apparatus in the fifth embodiment of the present invention.
FIG. 15 is a flowchart of a method of measuring an edge shape in the fifth embodiment of the present invention.

Further, the edge shape measurement apparatus 100 in the fifth embodiment is different in configuration of the control device 30 from the edge shape measurement apparatus 100 in the first embodiment as shown in a functional block diagram in FIG. 14. That is, the controller, control device 30, in the fifth embodiment has the control unit 32, the storage unit 34, the communication unit 36, a calibration unit 44, and a positioning unit 46.

The calibration unit 44 corresponds to a CPU, and has a configuration of calling a calibration program from the storage unit 34 to make the displacement sensor 12 measure a measurement distance to each measurement point of the jig JG at a predetermined rotational angle θ of the displacement sensor 12. As an example, the calibration unit 44 has a configuration of measuring a distance to the jig JG when the rotational angle θ of the displacement sensor 12 is −90°, 0°, and 90° (i.e., three rotational angles θ). Further, the calibration unit 44 has a configuration of driving at least one of the holding table 52, the up-and-down motion mechanism 54, and the slide mechanism 56 to adjust the position of the jig JG so that each measurement distance falls within a predetermined range, and acquiring, as a calibration distance, the measurement distance when each measurement distance falls within the predetermined range. It should be noted that the calibration unit 44 may have a configuration of driving the up-and-down motion mechanism, the slide mechanism, or the up-and-down motion mechanism and the slide mechanism (both not shown) to adjust the position of the displacement sensor 12. According to the above, even when the acquisition of the thickness of the wafer W is difficult, it is possible to acquire the rotation radius of the displacement sensor 12 based on the calibration distance. A specific calibration method will be described in detail in <<Method of Measuring Edge Shape>>.

It should be noted that the calibration unit 44 may have a configuration in which the calibration distance acquired in association with the rotational angle θ of the displacement sensor 12 is acquired as the deviation at each rotational angle θ, and is stored in the storage unit 34.

The positioning unit 46 corresponds to a CPU, and has a configuration in which a positioning program is called from the storage unit 34, and the rotational center CTR and the rotational range are adjusted so that the distances from the displacement sensor 12 to the upper and lower surfaces of the wafer W become predetermined distances (as an example, the distances to the upper and lower surfaces of the wafer W are equal to each other), and the edge shape of the wafer W, which is included in a range determined in advance by the user, and the measurement range from an end point of the wafer W toward the center of the wafer W, can be measured. It should be noted that when adjusting the rotational center CTR, it is sufficient to adjust a position of at least one of the wafer W (i.e., the wafer holding device 20) and the displacement sensor 12, and it is sufficient to have a configuration of moving the wafer W relatively to the displacement sensor 12. More specifically, the wafer holding device 20 may be provided with the up-and-down motion drive unit 27 and the slide drive unit 28 coupled to the cylindrical part 24. That is, the positioning unit 46 has a configuration of driving the up-and-down motion drive unit 27, the slide drive unit 28, or the up-and-down motion drive unit 27 and the slide drive unit 28. By the edge shape measurement apparatus 100 including the positioning unit 46, it is possible to measure the edge shape in the measurement range determined in advance by the user.

Method of Measuring Edge Shape

The method of measuring the edge shape in the fifth embodiment is provided with a calibration step S51, a positioning step S53, and a measurement step S54 as shown in a flowchart in FIG. 15.

Figure 16:
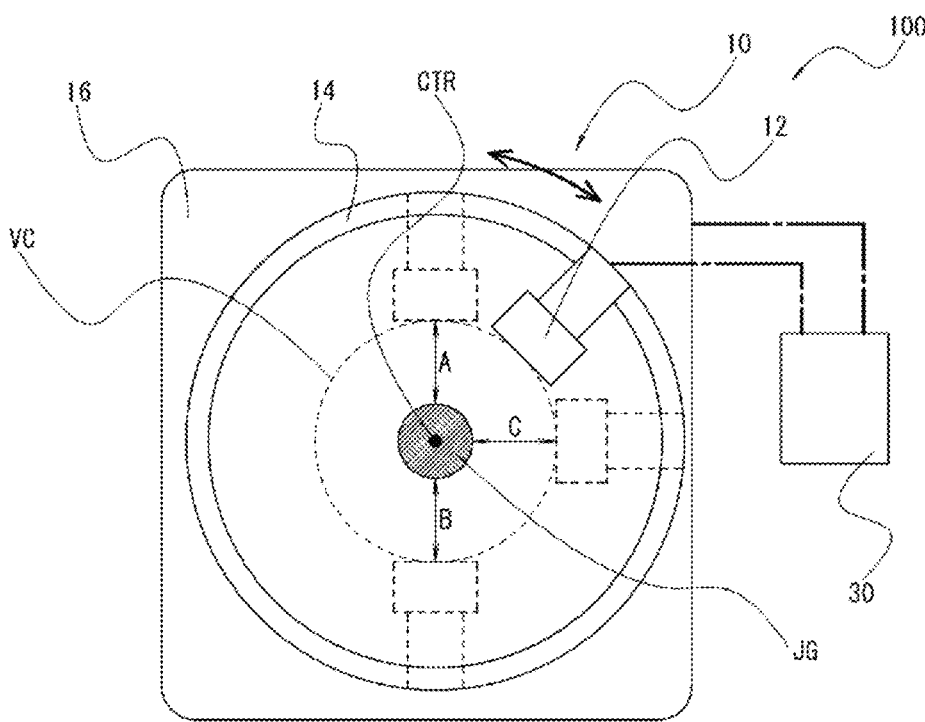
FIG. 16 is an explanatory diagram of a calibration step in the fifth embodiment of the present invention.

That is, in the method of measuring the edge shape in the fifth embodiment, first, the calibration step S51 is executed. As shown in an explanatory diagram in FIG. 16, in the calibration step S51, the jig holding mechanism 60 is made to hold a predetermined jig JG (a jig JG having a cylindrical portion as an example). It should be noted that the jig JG is held by the jig holding mechanism 60 so that the cylindrical portion of the jig JG becomes perpendicular to the rotational trajectory (i.e., a circular path) of the displacement sensor 12.

Subsequently, in the calibration step S51, each measurement distance to the side surface of the cylindrical portion of the jig JG at a predetermined rotational angle θ of the displacement sensor 12 is measured, and the measurement distance when each measurement distance falls within a predetermined range is acquired as the calibration distance.

More specifically, in the calibration step S51, the calibration unit 44 drives (alternatively, the user manually adjusts) the up-and-down motion mechanism 54 and the slide mechanism 56 so that the measurement distances when the rotational angle θ of the displacement sensor is −90°, 0°, and 90° (i.e., the three rotational angles θ) fall within a predetermined range (become equal to each other as an example), and the calibration unit 44 acquires, as the calibration distance, the measurement distance when each measurement distance falls within a predetermined range.

It should be noted that in the calibration step S51 in the present embodiment, a distance A to the jig JG when the rotational angle θ of the displacement sensor 12 is 90° and a distance B to the jig JG when the rotational angle θ is −90° are measured, and a position in the vertical direction of the jig JG is determined so that the distance A and the distance B are equal to each other.

More specifically, first, the calibration unit 44 drives the rotary drive unit 16 so that the rotational angle θ of the displacement sensor 12 becomes 90°. Then, the calibration unit 44 makes the displacement sensor 12 measure the distance A to the jig JG. Subsequently, the calibration unit 44 drives the rotary drive unit 16 so that the rotational angle θ of the displacement sensor 12 becomes −90°. Then, the calibration unit 44 makes the displacement sensor 12 measure the distance B to the jig JG. Subsequently, the calibration unit 44 compares the distance A and the distance B to each other, executes a predetermined calculation, and then drives the up-and-down motion mechanism 54 based on the calculation result. Then, the calibration unit 44 repeats the steps described above until the distance A and the distance B become equal to each other or the difference between the distances A, B becomes within a predetermined range.

Then, in the calibration step S51, when the position in the vertical direction of the jig JG is determined, a distance C to the jig JG when the rotational angle θ of the displacement sensor 12 is 0° is further measured, and the position in the horizontal direction of the jig JG is determined so that the distance A, the distance B, and the distance C become equal to each other.

More specifically, first, the calibration unit 44 drives the rotary drive unit 16 so that the rotational angle θ of the displacement sensor 12 becomes 0°. Then, the calibration unit 44 makes the displacement sensor 12 measure the distance C to the jig JG. Subsequently, the calibration unit 44 compares the distance C and the distances A, B to each other, executes a predetermined calculation, and then drives the slide mechanism 56 based on the calculation result. Then, the calibration unit 44 repeats the steps described above until the distance A, the distance B, and the distance C become equal to each other or the difference between the distance C and the distances A, B becomes within a predetermined range. Thus, the rotational center CTR of the displacement sensor 12 is set within a predetermined range inside the jig JG.

Then, in the calibration step S51, the calibration unit 44 acquires, as the calibration distance, a distance (any one of the distances A, B, and C in this case) to the jig JG when the positions in the vertical direction and the horizontal direction of the jig JG are determined.

By executing the calibration step S51, even when the acquisition of the thickness of the wafer W is difficult, it is possible to acquire the rotation radius of the displacement sensor 12 based on the calibration distance. It should be noted that when a known multicolor confocal displacement sensor is adopted as the displacement sensor 12, since a distance corresponding to one wavelength of the multicolor confocal displacement sensor is determined by acquiring the calibration distance and the wavelength corresponding to that calibration distance, it is possible to accurately measure the distance to the edge portion of the wafer W.

It should be noted that in the calibration step S51, the calibration distance acquired in association with the rotational angle θ of the displacement sensor 12 may be acquired as the deviation at each rotational angle θ, and may be stored in the storage unit 34. That is, the correction step S33 in the third embodiment may be executed using the deviation acquired in the calibration step S51.

Figure 17:
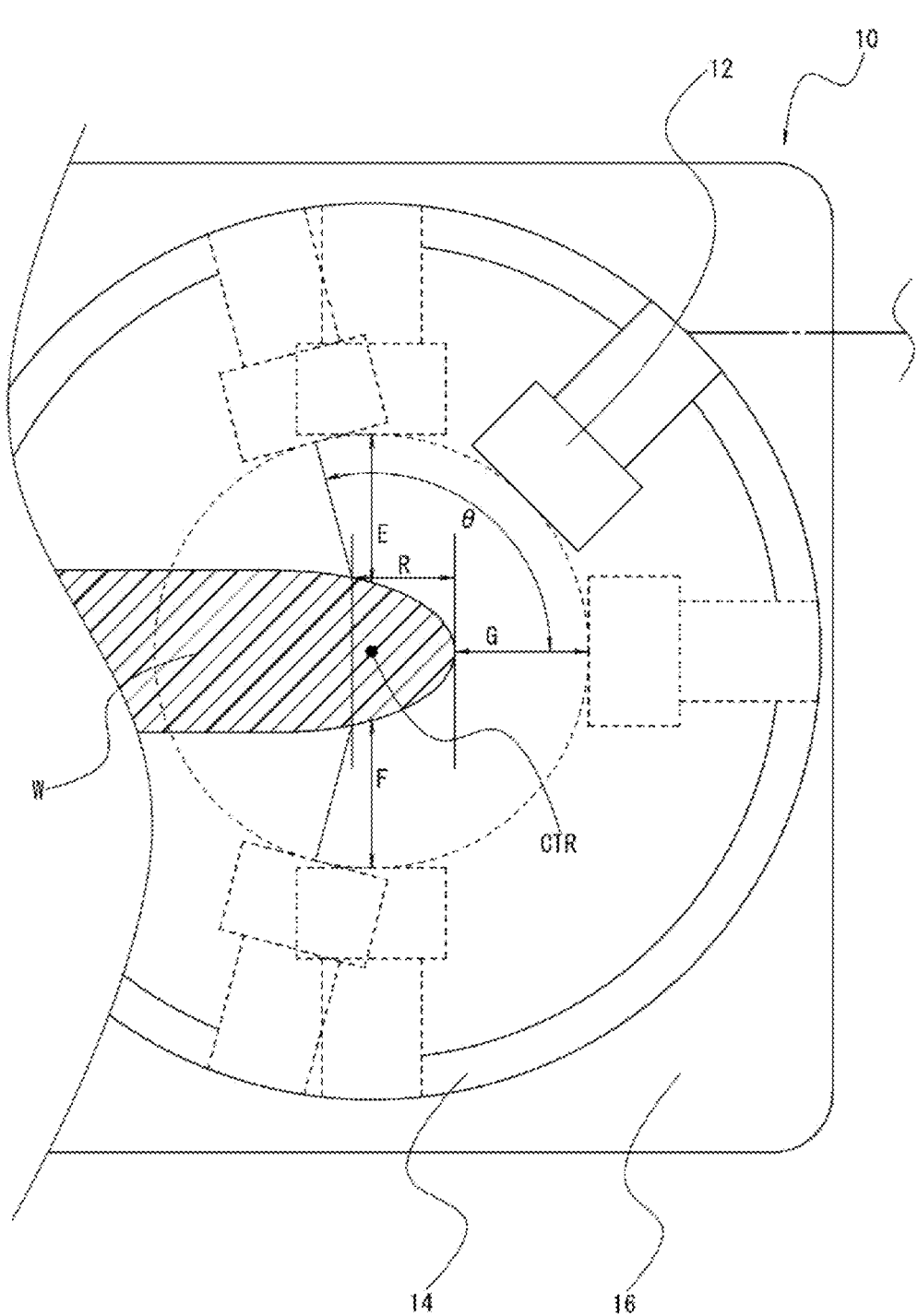
FIG. 17 is an explanatory diagram of a positioning step in the fifth embodiment of the present invention.

As a post-step of the calibration step S51, the positioning step S53 is executed after executing a preparation step S52 (corresponding to the preparation step S10). As shown in FIG. 17, in the positioning step S53, first, a distance E to the upper surface of the wafer W when the rotational angle θ of the displacement sensor 12 is 90° and a distance F to the lower surface of the wafer W when the rotational angle θ is −90° are measured, and the up-and-down motion drive unit 27 determines the position in the vertical direction of the wafer W so that the distance E and the distance F become equal to each other.

More specifically, first, the positioning unit 46 drives the rotary drive unit 16 so that the rotational angle θ of the displacement sensor 12 becomes 90°. Then, the positioning unit 46 makes the displacement sensor 12 measure the distance E to the wafer W. Subsequently, the positioning unit 46 drives the rotary drive unit 16 so that the rotational angle θ of the displacement sensor 12 becomes −90°. Then, the positioning unit 46 makes the displacement sensor 12 measure the distance F to the wafer W. Subsequently, the positioning unit 46 compares the distance E and the distance F to each other, executes a predetermined calculation, and then drives the up-and-down motion drive unit 27 based on the calculation result. Then, the positioning unit 46 repeats the steps described above until the distance E and the distance F become equal to each other or the difference between the distances E, F becomes within a predetermined range.

Subsequently, in the positioning step S53, the rotational center CTR and the rotation range of the displacement sensor 12 are adjusted so that the edge shape of the wafer W, which is included in a range determined in advance by the user, and a measurement range R from an end point of the wafer W toward the center of the wafer W, can be measured. It should be noted that the measurement range R is in a range of about 0.5 mm to several millimeters as an example, but is not limited thereto. Further, the rotation range is −105°≤θ≤105°, as an example, but is not limited thereto.

More specifically, first, the positioning unit 46 drives the rotary drive unit 16 so that the rotational angle θ of the displacement sensor 12 becomes 0°. Then, the positioning unit 46 makes the displacement sensor 12 measure a distance G to the wafer W. Then, the positioning unit 46 drives the slide drive unit 28 so that the distance G becomes the shortest in a range in which the displacement sensor 12 and the wafer W do not interfere with each other. Then, the positioning unit 46 drives the rotary drive unit 16 to move the displacement sensor 12 to the rotational angle θ (each of the rotational angles θ to the upper surface and the lower surface of the wafer W) at which the edge shape of the wafer W included in the measurement range R can be measured, and acquires the rotation range on that occasion.

Subsequently, by executing a measurement step S54 (corresponding to the measurement step S11) in the rotation range described above, the edge shape of the wafer W can be acquired. That is, since the distance $r_1$ corresponding to one wavelength of the displacement sensor (multicolor confocal displacement sensor) 12 is acquired by the calibration step S51, the distance $r_1$ corresponding to other wavelengths can also be acquired with high accuracy. Further, in cooperation with the positioning step S53, the edge shape of the wafer W in the range desired by the user can be acquired with high accuracy.

The measurement of the edge shape of the wafer W may be executed throughout the entire circumference of the end surface of the wafer W. That is, as shown in the flowchart in FIG. 15, after ending the measurement of the edge shape of the wafer W on one phase, the wafer W is rotated by about 1° with the rotary drive unit 26, and then the positioning step S53 and the measurement step S54 are executed. By repeating these steps until the measurement corresponding to the entire circumference of the wafer W is completed, it is possible to measure the edge shape of the whole of the wafer W.

As described above, since the method of measuring the edge shape is provided with the calibration step S51 and the positioning step S53, even when the thickness of the wafer W cannot be acquired, the edge shape of the wafer W can be measured with high accuracy.

It should be noted that the present invention is not limited to the embodiments described hereinabove, and can variously be modified within the scope or the spirit of the invention. As an example, a controller such as control device 30 may have a configuration including at least one of the coordinate conversion unit 38, the correction unit 40, the rotation radius acquisition unit 42, and the calibration unit 44 and the positioning unit 46 besides the control unit 32, the storage unit 34, and the communication unit 36. Further, the method of measuring the edge shape may have a configuration including at least one of the coordinate conversion step S22, the correction step S33, and the first measurement step S41, the second measurement step S42, and the rotation radius acquisition step S43, and the calibration step S51 and the positioning step S53 besides the measurement step S11.

As another example, in the fifth embodiment, the controller is control device 30 that may have a configuration of including the control unit 32, the storage unit 34, the communication unit 36, and the calibration unit 44. Further, the method of measuring the edge shape in the fifth embodiment may have a configuration of including the calibration step S50, the preparation step S52, and the measurement step S54.

What is claimed is:

1. An edge shape measurement apparatus comprising:
a displacement sensor configured to measure an edge shape of a wafer having a plate like shape, wherein
the displacement sensor has a configuration of being rotationally driven setting a predetermined point inside the wafer as a rotational center in a plane which includes the rotational center, and is perpendicular to upper and lower surfaces of the wafer while keeping a constant radius with respect to the rotational center, and
has a configuration of measuring a distance to one point on a surface of the wafer located on a straight line connecting the rotational center and the displacement sensor by a rotational angle; and
a first controller having a positioning unit, wherein the positioning unit is configured to adjust the rotational center and a rotation range of the displacement sensor so that distances from the displacement sensor to an upper surface and a lower surface of the wafer are predetermined distances, and the edge shape of the wafer, which is included in a range determined in advance by a user, and a measurement range from an end point of the wafer toward a center of the wafer, can be measured.

2. The edge shape measurement apparatus according to claim 1 further comprising:
a second controller having a coordinate conversion unit, wherein the coordinate conversion unit is configured to convert the distances measured by the displacement sensor into an X-Y coordinate system in the plane.

3. The edge shape measurement apparatus according to claim 1 further comprising:
a predetermined jig and a jig holding mechanism configured to hold the jig and adjust a position of the jig with respect to the displacement sensor, wherein
the displacement sensor is configured to acquire a calibration distance by measuring measurement distances to the jig at predetermined rotational angles.

4. The edge shape measurement apparatus according to claim 3 further comprising:
a third controller having a calibration unit, wherein
the calibration unit is configured to make the jig adjust a position of the jig or the displacement sensor so that measurement distances to the jig at predetermined rotational angles of the displacement sensor fall within a predetermined range, and to acquire, as the calibration distance, the measurement distance when the measurement distances fall within the predetermined range.

5. The edge shape measurement apparatus according to claim 1 further comprising:
a fourth controller having a correction unit, wherein
the correction unit is configured to correct the distance based on a deviation acquired in advance by the correction unit.

6. The edge shape measurement apparatus according to claim 1 further comprising:
a fifth controller having a rotation radius acquisition unit, wherein
the rotation radius acquisition unit is configured to acquire a rotation radius of the displacement sensor based on a thickness of the wafer and a distance to a position corresponding to the thickness of the wafer.

7. The edge shape measurement apparatus according to claim 1 wherein
the displacement sensor is configured to rotationally be driven to at least one of the rotation range and the rotational center in which a position corresponding to a thickness of the wafer can be measured.

8. The edge shape measurement apparatus according to claim 1 wherein
the displacement sensor is a multicolor confocal displacement sensor.

9. A method of measuring an edge shape of a wafer having a plate like shape, the method comprising:
a positioning step configured to adjust the rotational center and a rotation range of the displacement sensor so that distances from the displacement sensor to an upper surface and a lower surface of the wafer are predetermined distances, and the edge shape of the wafer, which is included in a range determined in advance by a user, and a measurement range from an end point of the wafer toward a center of the wafer, can be measured;
and as a post-step of the positioning step, a measurement step of rotationally driving a displacement sensor setting a predetermined point inside the wafer as a rotational center in a plane including the rotational center and perpendicular to upper and lower surfaces of the wafer while keeping a constant radius, and measuring a distance to a point on a surface of the wafer located on a straight line connecting the rotational center and the displacement sensor for each rotational angle.

10. The method of measuring the edge shape according to claim 9 further comprising:

as a post-step of the measurement step, a coordinate conversion step configured to convert the distances measured by the displacement sensor into an X-Y coordinate system in the plane.

11. The method of measuring the edge shape according to claim 9 further comprising:

as a pre-step of the measurement step, a calibration step configured to adjust a position of a predetermined jig so that measurement distances to the jig at predetermined rotational angles of the displacement sensor fall within a predetermined range, and to acquire, as a calibration distance, the measurement distance when the measurement distances fall within the predetermined range.

12. The method of measuring the edge shape according to claim 9 further comprising:

as a pre-step of the measurement step, a correction step configured to correct the distance based on a deviation acquired in advance.

13. The method of measuring the edge shape according to claim 9 further comprising:

as a pre-step of the measurement step, a first measurement step of measuring a thickness of the wafer;

as a post-step of the first measurement step, a second measurement step of measuring a distance to a position corresponding to the thickness of the wafer; and as a post-step of the second measurement step, a rotation radius acquisition step configured to acquire a rotation radius of the displacement sensor based on the thickness measured in the first measurement step and the distance measured in the second measurement step.

14. The method of measuring the edge shape according to claim 9 wherein in the measurement step, step of performing rotational drive to at least one of the rotation range and the rotational center in which a position corresponding to a thickness of the wafer can be measured.

15. The method of measuring the edge shape according to claim 9 wherein the displacement sensor is a multicolor confocal displacement sensor.

* * * * *